United States Patent
Bruns et al.

(10) Patent No.: US 10,426,087 B2
(45) Date of Patent: Oct. 1, 2019

(54) USER INTERFACE PERFORMANCE GRAPH FOR OPERATION OF A MOBILE MACHINE

(71) Applicant: Deere & Company, Moline, IL (US)

(72) Inventors: Aaron J. Bruns, Bettendorf, IA (US); Timothy S. Hunt, Davenport, IA (US); Brian J. Gilmore, Geneseo, IL (US)

(73) Assignee: Deere & Company, Moline, IL (US)

( * ) Notice: Subject to any disclaimer, the term of this patent is extended or adjusted under 35 U.S.C. 154(b) by 763 days.

(21) Appl. No.: 14/251,161

(22) Filed: Apr. 11, 2014

(65) Prior Publication Data

US 2015/0293507 A1 Oct. 15, 2015

(51) Int. Cl.
*A01D 41/127* (2006.01)
*G07C 5/08* (2006.01)

(52) U.S. Cl.
CPC ..... *A01D 41/127* (2013.01); *B60W 2300/158* (2013.01); *G07C 5/0825* (2013.01)

(58) Field of Classification Search
CPC ........... G05B 2219/23286; G05B 2219/31467; G05B 2219/3169–31479; G05B 2219/32128; G05B 2219/32149; G05B 15/02; G05B 2219/31469–31479; Y10S 715/965; G07C 5/0825; B60W 2300/15; B60W 2300/158; A01C 7/10–105; A01C 23/007; A01D 41/127–1278; A01D 43/085; A01D 46/085
USPC ............................................. 700/83; 701/50
See application file for complete search history.

(56) References Cited

U.S. PATENT DOCUMENTS

| | | | | |
|---|---|---|---|---|
| 6,863,604 B2 * | 3/2005 | Behnke | ................ | A01D 41/127 460/6 |
| 7,242,311 B2 * | 7/2007 | Hoff | ......................... | E02F 9/20 340/425.5 |
| 7,406,399 B2 * | 7/2008 | Furem | ..................... | E02F 9/267 37/379 |
| 7,580,781 B2 * | 8/2009 | Mindeman | ......... | G05B 23/0267 340/438 |
| 7,979,192 B2 * | 7/2011 | Morrison | ................ | F02D 41/22 701/31.9 |
| 8,019,517 B2 * | 9/2011 | Boenig | ................ | A01D 41/127 460/1 |

(Continued)

FOREIGN PATENT DOCUMENTS

CN 101637080 A 2/2010
CN 104977861 10/2015
(Continued)

OTHER PUBLICATIONS

Machine Translation of EP 1900272, Espacenet [online], 2008 [retrieved Feb. 10, 2016], Retrieved from Internet: <URL: http://worldwide.espacenet.com>, pp. 1-4.*

(Continued)

*Primary Examiner* — Todd Aguilera
(74) *Attorney, Agent, or Firm* — Joseph R. Kelly; Kelly, Holt & Christenson PLLC

(57) ABSTRACT

A machine control system receives sensor signals indicative of sensed variables on a mobile machine and calculates performance metric values for the mobile machine based upon the sensed variables. The machine control system displays information indicative of the performance metric value for the mobile machine on a time continuous user interface display.

10 Claims, 12 Drawing Sheets

(56) References Cited

U.S. PATENT DOCUMENTS

| | | | | |
|---|---|---|---|---|
| 8,271,429 | B2* | 9/2012 | Ghuneim | G06F 17/30554 |
| | | | | 707/602 |
| 8,406,964 | B2* | 3/2013 | Baumgarten | A01D 41/127 |
| | | | | 701/50 |
| 8,594,883 | B2* | 11/2013 | Gilbert | G07C 5/008 |
| | | | | 701/33.2 |
| 8,779,916 | B2* | 7/2014 | Van Camp | G05B 19/0428 |
| | | | | 340/506 |
| 2003/0066277 | A1* | 4/2003 | Behnke | A01D 41/127 |
| | | | | 56/10.2 R |
| 2004/0051721 | A1* | 3/2004 | Ramseth | G06F 19/3406 |
| | | | | 345/689 |
| 2005/0081410 | A1* | 4/2005 | Furem | E02F 9/267 |
| | | | | 37/379 |
| 2006/0092033 | A1* | 5/2006 | Hoff | E02F 9/20 |
| | | | | 340/679 |
| 2007/0135977 | A1* | 6/2007 | Mindeman | G05B 23/0267 |
| | | | | 701/33.8 |
| 2007/0260374 | A1* | 11/2007 | Morrison | F02D 41/22 |
| | | | | 701/99 |
| 2008/0071796 | A1* | 3/2008 | Ghuneim | G06F 17/30554 |
| 2009/0312920 | A1* | 12/2009 | Boenig | A01D 41/127 |
| | | | | 701/50 |
| 2010/0125788 | A1* | 5/2010 | Hieronymus | A01D 41/127 |
| | | | | 715/702 |
| 2010/0179717 | A1* | 7/2010 | Gilbert | G07C 5/008 |
| | | | | 701/31.4 |
| 2010/0217474 | A1* | 8/2010 | Baumgarten | A01D 41/127 |
| | | | | 701/31.4 |
| 2013/0099916 | A1* | 4/2013 | Camp | G05B 19/0428 |
| | | | | 340/501 |
| 2013/0144827 | A1* | 6/2013 | Trevino | G06N 5/02 |
| | | | | 706/46 |

FOREIGN PATENT DOCUMENTS

| | | | | |
|---|---|---|---|---|
| EP | 1297733 | A1* | 4/2003 | A01D 41/127 |
| EP | 1900272 | A1 | 3/2005 | |
| EP | 1714540 | A1 | 10/2006 | |
| EP | 1900272 | A1 | 3/2008 | |
| EP | 1714540 | B1 | 7/2010 | |
| EP | 2929773 | | 4/2014 | |
| WO | 2006128786 | A1 | 12/2006 | |

OTHER PUBLICATIONS

"CEMOS Automatic", Retrieved at: <<http://www.claasofamerica.com/product/precision-farming/empty_page/cemos-automatic>>, Date Retrieved: Jan. 14, 2015, 2 pages.

"CEMOS Dialog", Retrieved at: <<http://www.claasofamerica.com/product/precision-farming/empty_page/cemos-dialog>>, Date Retrieved: Jan. 14, 2015, 1 page.

Extended Search Report dated Feb. 9, 2015, Application No. 15160067.6-1655. 3 pages.

Chinese First Office Action Application No. 201510169311.5 dated Aug. 24, 2018. 11 pages w/translation.

AU Patent Application No. 2015201810 Examination Report No. dated Jan. 23, 2019, 3 pages.

* cited by examiner

USER INTERFACE PERFORMANCE GRAPH FOR OPERATION OF A MOBILE MACHINE

FIELD OF THE DISCLOSURE

The present disclosure relates to mobile equipment. More specifically, the present disclosure relates to displaying performance metrics for an operator of a mobile machine.

BACKGROUND

There are a wide variety of different types of mobile machines, such as construction equipment, turf and forestry equipment, agricultural equipment, etc. They can be very complex and difficult to operate. For example, an operator of a combine, may require years of experience and many hours of training before he or she can achieve relatively high performance in operating the combine.

While some pieces of mobile equipment have a variety of different sensors and control systems, they often still rely on operator perception and manual control inputs. As part of such control systems, the sensors provide sensor signals that are fed back to a main control computer. The main control computer generates various displays that are indicative of the sensed variables. These displays can be provided in order to assist the operator in making adjustments in order to improve performance.

The discussion above is merely provided for general background information and is not intended to be used as an aid in determining the scope of the claimed subject matter.

SUMMARY

A machine control system receives sensor signals indicative of sensed variables and calculates performance metrics based upon the sensed variables. The machine control system displays the performance metrics on a time continuous user interface display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
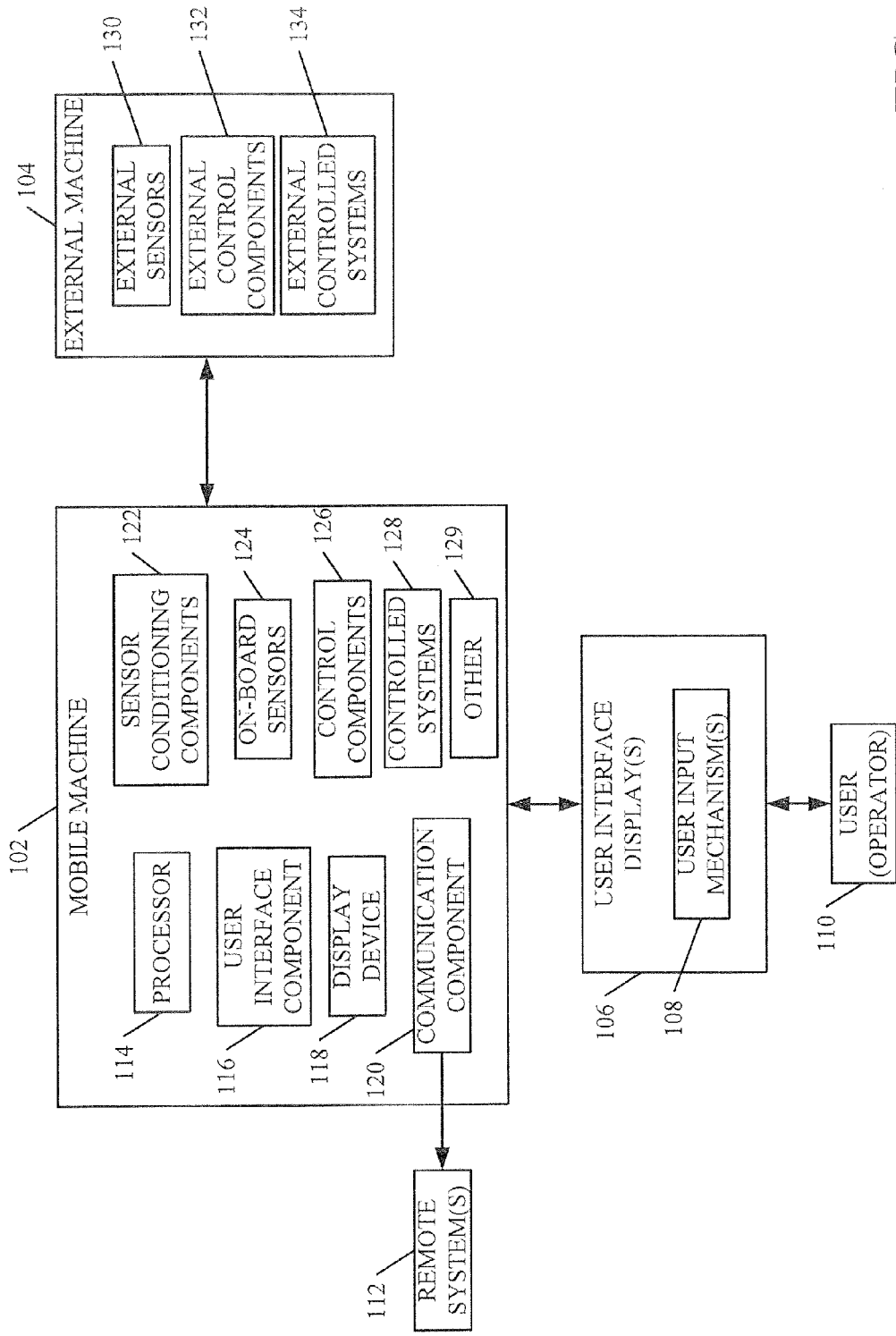
FIG. 1 is a block diagram of one embodiment of a control system that generates a time continuous display of performance metrics.

FIG. 1 is a block diagram of one illustrative control system architecture 100. Architecture 100 illustratively includes mobile machine 102, and it can include an external machine 104. By way of example, mobile machine 102 may be an agricultural machine, such as a combine, and no external machine 104 is used. In another embodiment, machine 102 is a tractor and external machine 104 may be an attachment, or another machine that is towed behind the tractor. These are exemplary embodiments only.

FIG. 1 shows that mobile machine 102 illustratively generates user interface displays 106 with user input mechanisms 108 that are provided for interaction by user (or operator) 110. As is described in greater detail below, the user interface displays 106 can illustratively include a time continuous display (such as a strip chart or another type of display) that displays measured or calculated values, or values determined in other ways, plotted along a timeline.

FIG. 1 also shows that mobile machine 102 can illustratively communicate with one or more remote systems 112. Remote systems 112 can include a wide variety of systems, and some examples of those are described below with respect to FIG. 4.

In the embodiment shown in FIG. 1, mobile machine 102 illustratively includes processor 114, user interface component 116, display device 118, communication component 120, sensor conditioning components 122, on-board sensors 124, control components 126 and controlled systems 128. It can include other components 129 as well. User interface component 116 can, either by itself or under the control of another item in machine 102, generate user interface displays 106 for display on display device 118. On-board sensors 124 sense a variety of variables and provide sensor signals to sensor conditioning components 122. Sensor conditioning components 122 can perform compensation, linearization, filtering, or other calibration and conditioning operations on the sensor signals. Control components 126 illustratively receive the sensor signals, after they are conditioned, and generate control signals to control various aspects of mobile machine 102, or external machine 104, based upon the sensed variables. The control signals are provided to various controlled systems 128 that are controlled based upon the sensor signals. The controlled systems can be electrical systems, mechanical systems, hydraulic systems, pneumatic systems, air-over-hydraulic systems, or other systems. The sensor signals and control signals can also be provided to user interface component 116 which uses them to generate the time continuous user interface display 106. Some more detailed embodiments for generating the display are described below with respect to FIGS. 2-9.

FIG. 1 shows that external machine 104 can also include a variety of different external sensors 130 which sense variables and provide sensor signals (after they are conditioned) to external control components 132. Control components 132 generate control signals for controlling controlled systems on external machine 104. The external controlled systems are indicated by block 134 in FIG. 1. In one embodiment, the sensor signals and control signals can also be provided to user interface component 116 on machine 102, where they are used to generate the time continuous display.

Figure 2:
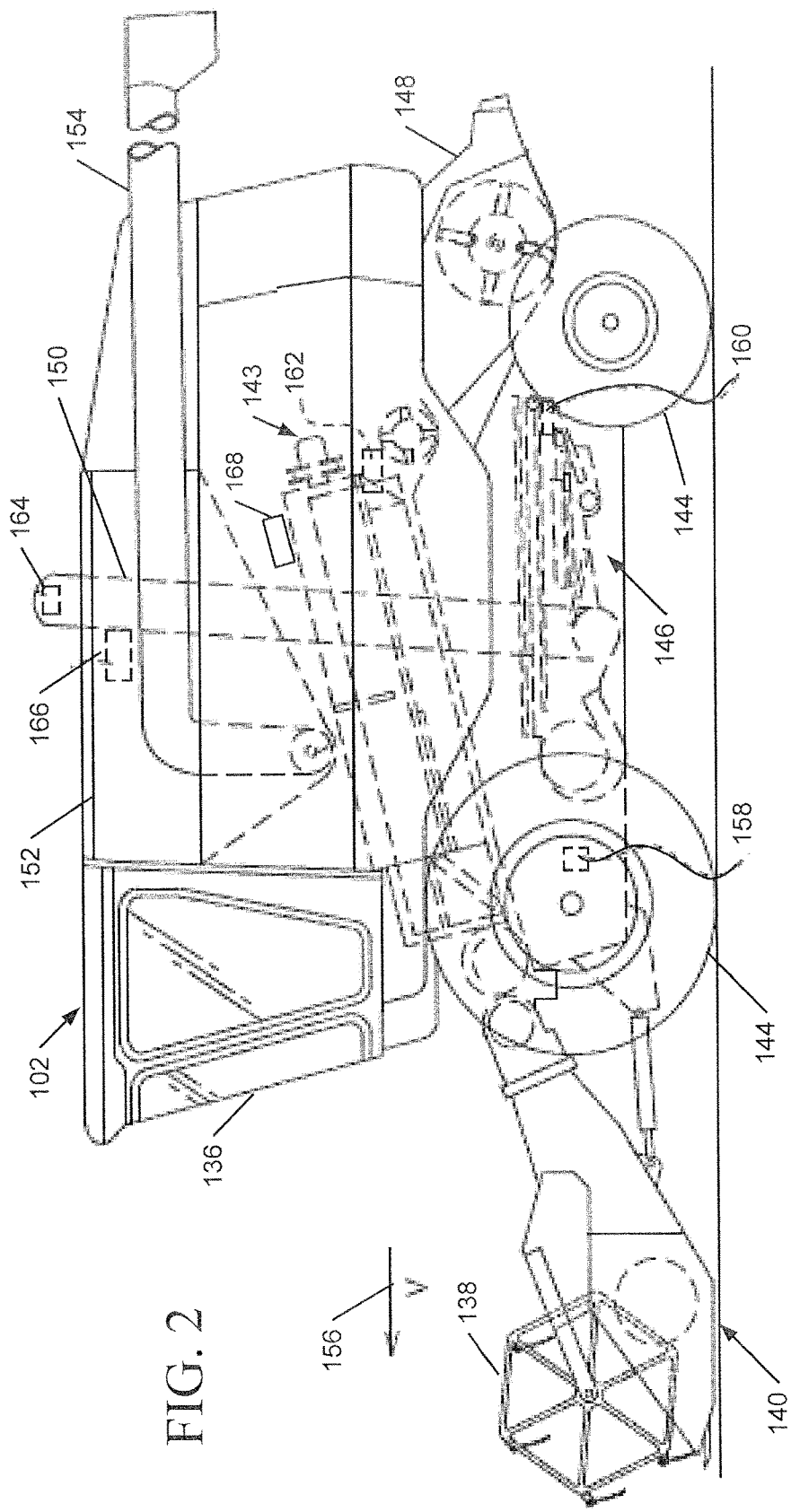
FIG. 2 is a pictorial illustration of one implementation of the control system shown in FIG. 1 deployed on a combine.

FIG. 2 shows one pictorial illustration in which mobile machine 102 is a combine. It can be seen in FIG. 2 that combine 102 illustratively includes an operator's compartment 136, a header 138, a cutter generally indicated at 140, a thresher generally indicated at 142, a set of ground engaging wheels 144, a separator 146, a spreader 148, an elevator 150, a clean grain tank 152 and a spout 154. In operation, combine 102 illustratively travels in the direction generally indicated by arrow 156. Header 138 engages the product being harvested and gathers it toward cutter 140. After it is cut, it is moved toward thresher 142 where it is threshed, and then moved to separator 143. The grain falls to cleaning shoe 146 and the clean grain is moved by elevator 150 into clean grain tank 152. Tailings can be passed back to thresher 142 where they are re-threshed. Material other than grain (such as stalks, husks, etc.) are chopped and removed from machine 102 by spreader 148.

FIG. 2 also shows that, in one embodiment, combine 102 includes a ground speed sensor 158, one or more cleaning shoe loss sensors 160, one or more separator loss sensors 162, a yield monitor sensor 164, a clean grain camera 166 and a tailings camera 168. Ground speed sensor 158 illustratively senses the travel speed of combine 102 over the ground. This can be done by sensing the speed of rotation of the wheels, the drive shaft, the axle, or other components. The travel speed can also be sensed by a position sensing system, such as a global positioning system (GPS), a dead reckoning system, a LORAN system, or a wide variety of other systems or sensors that provide an indication of travel speed.

Cleaning shoe loss sensors 160 illustratively provide an output signal indicative of the quantity of grain lost by both the right and left cleaning shoes. In one embodiment, sensors 160 are strike sensors which count grain strikes per unit of time to provide an indication of the cleaning shoe grain loss.

Separator loss sensors 162 provide a signal indicative of grain loss in the left and right separators 143. This can be done by a wide variety of different types of sensors as well.

Yield monitor sensor 164 is a sensor that senses yield. In one embodiment, it can sense mass flow through elevator 150. It provides an output signal indicative of this, to indicate the particular yield. This can be measured in bushels per hour, bushels per acre, or in other ways.

Tailings camera 168 illustratively generates a video image of the tailings that are being passed back to the thresher for re-threshing. Clean grain camera 166 provides a video image indicative of the quality of the grain being deposited in clean grain tank 152.

Figure 3:
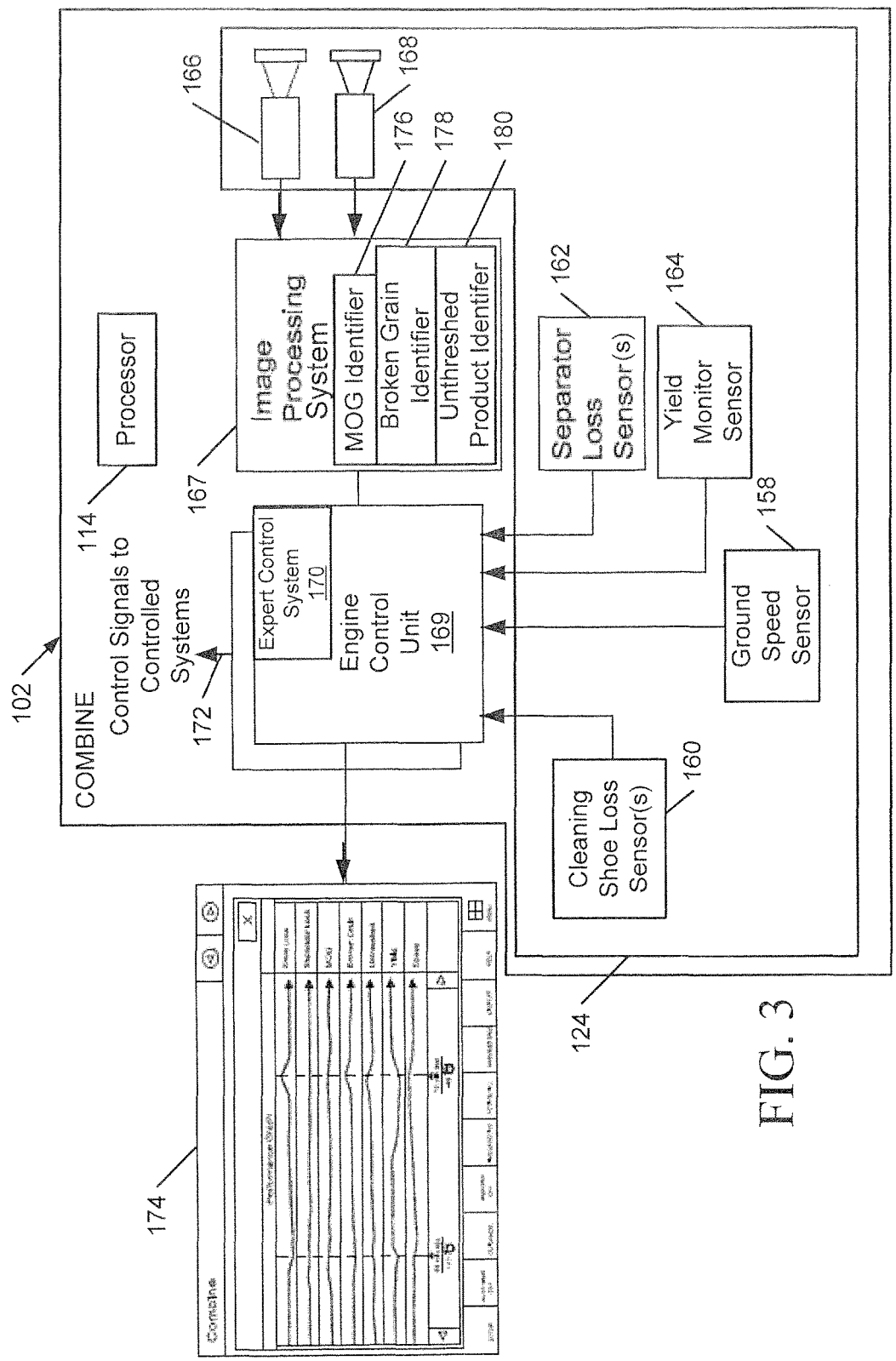
FIG. 3 is a more detailed block diagram of the control system shown in FIG. 1, when deployed on a combine.

FIG. 3 is a block diagram of the control system architecture 100, shown in FIG. 1, but implemented using the components described with respect to combine 102 shown in FIG. 2. While architecture 100 can be disposed on any mobile machine, it is described in the context of a combine for the sake of example only. Thus, it can be seen in FIG. 3 that the on-board sensors 124 illustratively include ground speed sensor 158, cleaning shoe loss sensors 160, separator loss sensors 162, yield monitor sensor 164 and cameras 166 and 168. Also, in the embodiment shown in FIG. 3, an image processing system 167 comprises one of the sensor conditioning components 122. It receives the video signals from cameras 166 and 168 and processes them to generate output signals indicative of various parameters or performance metrics. In one embodiment, system 167 illustratively includes a material other than grain (MOG) identifier 176, a broken grain identifier 178 and an un-threshed product identifier 180. Based upon the video signal from camera 166 in the clean grain tank 152, MOG identifier 176 generates an output signal indicative of a quantity (or percent or other measure) of material other than grain (such as cobs, husks, stalks, chaff, etc.) that is entering clean grain tank 172. Broken grain identifier 178 processes the video signal from camera 166 and identifies a quantity (or percent or other measure) of broken grain entering clean grain tank 152. Un-threshed product identifier 180 illustratively receives the video signal from tailings camera 168 and generates an output signal indicative of a quantity (or a percent or other measure) of un-threshed product that is being sent by the tailings elevator back to the thresher, for re-threshing.

Control components 126 illustratively include an engine control unit 169 that has an expert control system 170 deployed thereon. In one embodiment, engine control unit 169 receives the sensor signals and determines metric values for a plurality of different metrics based on the sensor signals. The metric values can be calculated, retrieved from memory or determined in other ways. It also illustratively uses expert control system 170, which can be a neural network, a rules-based system, or another type of expert system that can generate control signals 172. The control signals 172 can be output to the various controlled systems. The control signals 172 and the metric values can be output by engine control unit 169 to generate the time continuous user interface display, such as display 174 shown in FIG. 3.

In one embodiment, expert control system 170 can generate not only the control signals 172, but it also generates recommendations that can be displayed to the user or operator. By way of example, the recommendations can direct the operator to change the settings on the sieves, chaffers, concaves, fan/rotor, or other items on combine 102. Alternately, or in addition, expert control system 170 can generate the control signals, to automatically change or otherwise modify those settings. Further, in one embodiment, time continuous display 174 also indicates when recommendations were made to the operator, what those recommendations were, and when changes were made to the machine (either automatically or by the operator) and what those particular changes were. These items are described in greater detail below.

Figure 4:
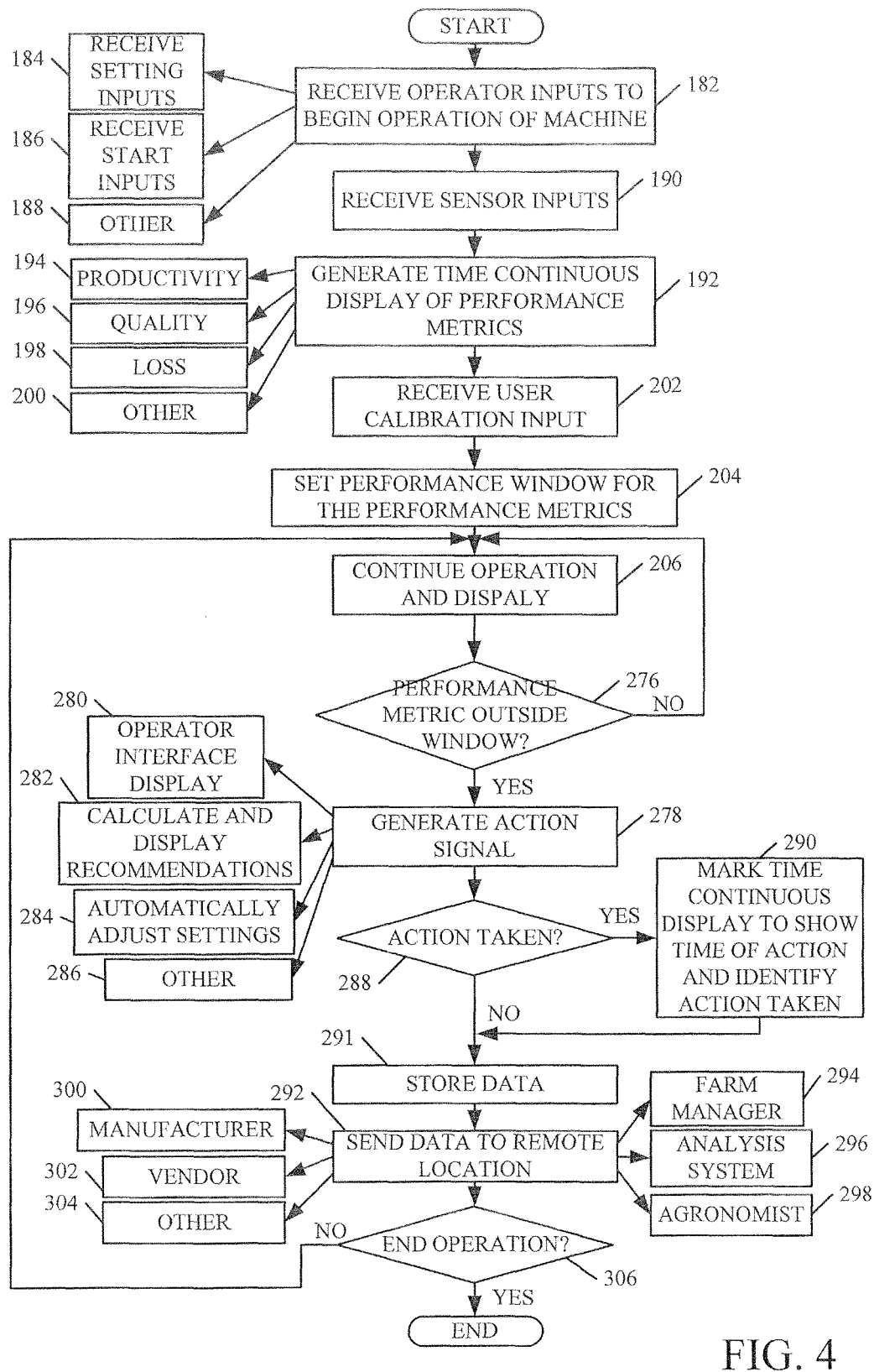
FIG. 4 is a flow diagram illustrating one embodiment of the overall operation of the control system shown in FIG. 3 in generating a time continuous display.
Figure 5:
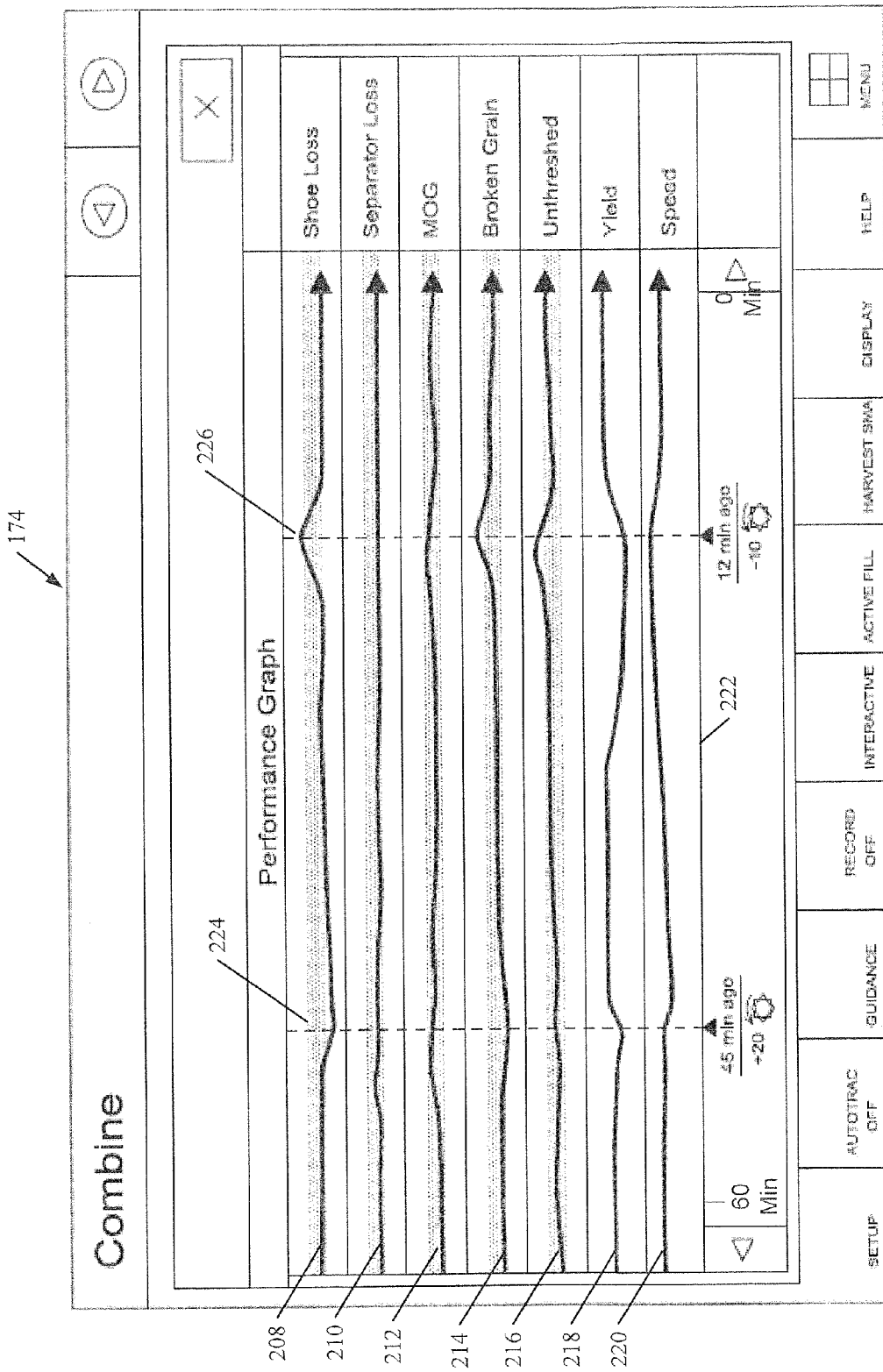
FIGS. 5 and 6 are two exemplary time continuous user interface displays.
Figure 6:
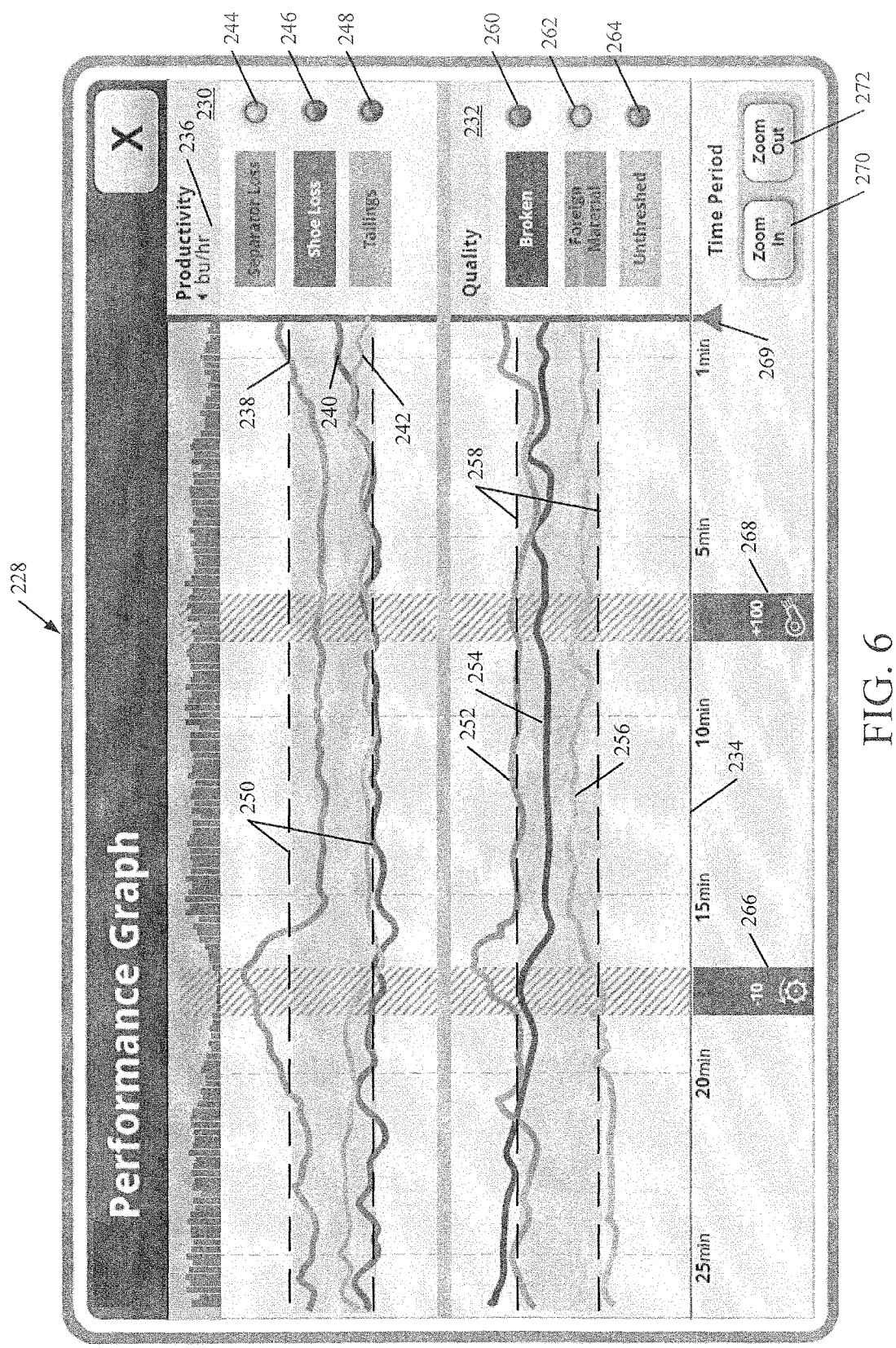

FIG. 4 is a flow diagram illustrating one embodiment of the operation of the system shown in FIG. 3 in generating the time continuous display 174. FIGS. 5 and 6 show two different embodiments of the time continuous display. FIGS. 3-6 will now be described in conjunction with one another.

Machine 102 first receives operator inputs to begin operation of the machine. This is indicated by block 182. This can be done in a variety of different ways. For instance, the operator can provide initial machine settings based on recommendations from expert control system 170. Alternatively, the operator can input these settings based upon his or her own prior experience and knowledge. The settings can be made manually, such as through mechanical or other user input mechanisms, or they can be made automatically by the machine itself, or they can be input in a different way, such as through a touch screen or other user input mechanism. Receiving initial operator settings is indicated by block 184. The operator then provides a start input indicating that the operator wishes to start operation of machine 102. This is indicated by block 186. The operator can of course provide other inputs as well, and this is indicated by block 188.

During operation of the machine 102, engine control unit 169 receives the inputs from the various sensors. This is indicated by block 190 in FIG. 4. Engine control unit 169 then determines the various performance metric values that are derived from the sensor signals and generates the time continuous display of those performance metrics. This is indicated by block 192. In one embodiment, the performance metrics include one or more productivity metrics 194, one or more quality metrics 196, one or more loss metrics 198, and they can include other metrics 200 as well.

When the operator believes that everything is set so that machine 102 is performing in an acceptable way, the operator illustratively provides a calibration input. This is indicated by block 202. For instance, the operator can illustratively actuate a calibration user input mechanism on the time continuous display, or the operator can provide this input using other user input mechanisms as well.

In any case, once engine control unit 169 receives the operator calibration input, engine control unit 169 calculates a threshold value for the performance metrics that can be displayed. In one embodiment, the threshold value is represented by a performance window. For instance, the engine control unit 169 identifies that the operator believes that the performance metrics are currently adequate, based on the calibration input. Therefore, engine control unit 169 may calculate a window around a current value for each of the performance metrics. The corresponding performance metric can vary within the range of its window, without causing engine control unit 169 to alert the operator that the metric is outside of a given range defined by the window.

The performance window around each performance metric can be calculated in a wide variety of different ways. In one embodiment, it can be set empirically, based upon the operator's previous operation of machine 102. In another embodiment, it can be a predefined window that is set around each performance metric. In yet another embodiment, it can be set heuristically, and it can even vary based upon context. For instance, if the machine is a combine that is harvesting corn, the windows may be set to one level. If it is harvesting soybeans or wheat, they may be set to different levels. The size of the windows can vary by performance metric, or they can all be set the same. Setting the performance window for the performance metrics is indicated by block 204 in FIG. 4.

Engine control unit 169 then continues to receive the sensor signals and generate the time continuous display, as machine 102 is being operated. This is indicated by block 206 in FIG. 4.

Before proceeding with the description of FIG. 4, a number of embodiments of the time continuous display will be described. FIG. 5 shows one embodiment of a time continuous display 174. It can be seen that the performance metrics for which the time continuous display 174 is generated include shoe loss, separator loss, MOG, broken grain, un-threshed product, yield and ground speed. Each of the performance metrics has an associated strip chart. For instance, shoe loss is displayed by strip chart 208. Separator loss is displayed by strip chart 210. MOG is displayed by strip chart 212. Broken grain is displayed by strip chart 214. Un-threshed product is displayed by strip chart 216. Yield is displayed by strip chart 218, and ground speed is displayed by strip chart 220. Each strip chart indicates a relative value of the corresponding performance metric along a timeline 222. It can be seen in the embodiment shown in FIG. 5 that the timeline extends from a current position (indicated by the numeral 0), to a position one hour in the past (indicated by 60 minutes). Thus, each strip chart 208-220 shows how the value of the corresponding performance metric varied over time.

In one embodiment, the time continuous displays for each performance metric are generated in quasi-real time. This means that, as the metric values are calculated, looked up, or otherwise determined based on the sensor signals, they are displayed without delay, other than the processing delay occurred in determining and rendering the values. The time continuous display can be generated from memory or otherwise as well and need not be quasi-real time. That is just one embodiment.

FIG. 5 also shows that a number of performance metrics have the calculated performance window displayed as well. The performance windows for each displayed metric are indicated by the horizontal dashed lines. Thus, engine control unit 169 indicates that, so long as the displayed performance metric varies within its corresponding performance window, the performance is adequate. If a performance metric deviates from its performance window, then engine control unit 169 can illustratively take action or make suggestions.

Display 174 also illustratively includes vertical lines 224 and 226. Each of the vertical lines marks a spot on the timeline 222 where an adjustment to the settings of machine 102 was made. For instance, at 45 minutes in the past, the rotor or fan speed was increased by 20 rpms. At 12 minutes in the past, the rotor or fan speed was decreased by 10 rpms. Thus, in the exemplary embodiment shown in FIG. 5, display 174 not only includes a time continuous display of various performance metrics, but it also shows a performance window and it marks when adjustments were made to the settings of machine 102, and what those adjustment were. The operator can then easily learn how the adjustments affect the performance metrics.

FIG. 6 shows another embodiment of a time continuous display 228. Display 228 is broken into two sections. The first being a productivity display section 230, and the second being a quality display section 232. Therefore, as one example, the display in FIG. 6 may be generated instead of that shown in FIG. 5, when the user wishes to see the displayed metrics grouped into different sections. The productivity display section 230 displays performance metrics related to productivity. It includes a yield graph display 236 that shows the yield, for example, in bar graph form, plotted along time axis 234. The yield is calculated at a plurality of discrete points in time and plotted along time axis 234. Productivity section 230 also includes strip chart 238 corresponding to separator loss, strip chart 240 corresponding to shoe loss, and strip chart 242 corresponding to tailings loss. Each of the performance metrics (separator loss, shoe loss and tailings loss) displayed in section 230 includes a corresponding indicator light 244, 246, and 248, respectively. These time continuous displays could also be in histogram form as well, such as by plotting a frequency of grain strikes per unit time. When any of the performance metrics deviate outside of the performance window indicated by dashed lines 250, the corresponding indicator light can change color, blink or otherwise provide a visual indication that the performance has deviated. The user interface component 116 can generate other user interface alerts as well, such as audible or haptic alerts, etc.

In the illustrated example, quality display section 232 also includes three strip charts that indicate performance metric values for performance metrics related to quality. Strip chart 252 corresponds to broken grain. Strip chart 254 corresponds to foreign material in the clean grain tank, and strip chart 256 corresponds to un-threshed product in the tailings. The quality performance window corresponding to each of the quality performance metrics is indicated by dashed lines 258. Also, as with section 230, the performance metrics in section 232 each have a corresponding indicator light 260, 262 and 264, respectively. Thus, when the corresponding performance metric deviates outside of the performance window indicated by lines 258, the indicator light 260-264 can change color, blink, or otherwise visually indicate the deviation.

As with display 174 shown in FIG. 5, display 228 can also include a set of vertically oriented sections 266 and 268. They show when the settings for machine 102 were changed, and what those changes were. For instance, section 266 indicates that the rotor speed was decreased by 10 rpms. Section 268 indicates that the blower speed was increased by 100 rpms. These are exemplary changes only.

Display 228 can also include a plurality of zoom buttons 270 and 272. When the buttons are actuated, they change the time scale displayed on timeline 234. For instance, when the user presses the "zoom in" button 270, the time scale on timeline 234 changes so that timeline 234 shows fewer minutes. When the user presses the "zoom out" button 272, the time scale on timeline 234 is changed so that timeline 234 displays more minutes.

FIG. 6 also illustratively shows a thumb 269. The user can illustratively drag the thumb 269 backward in time, along timeline 234, to scroll to various periods in the history on timeline 234.

Referring again to the flow diagram of FIG. 4, it can be seen that, at block 206, engine control unit 169 generates the time continuous display (such as one of those shown in FIGS. 5 and 6 or another display). So long as none of the performance metrics deviate outside of the corresponding performance window, and so long as the operator does not make any changes, this operation continues. This is indicated by block 276 in FIG. 4.

However, if one of the performance metrics deviates outside of the performance window, then engine control unit 169 generates an action signal. This is indicated by block 278. The action signal can generate one or more of a variety of different actions. In one embodiment, the action signal can generate an indicator on the time continuous display. For instance, it can turn on one of the indicator lights, flash a display element, generate an audible sound or otherwise generate an indicator indicating that the performance metric has deviated from the performance window. In another embodiment, it may be that the list of performance metrics is too long to have them all displayed on a single display. In an example where a performance metric is not currently being displayed and its value deviates outside the performance window, the action signal may cause it to be moved onto the current display and generate the corresponding indicator as well. Having the action signal generate an effect on the display is indicated by block 280.

In another embodiment, the action signal can cause expert system 170 to determine and display recommendations to the operator for changing the settings of machine 102. For instance, it may suggest that the operator change the rotor speed, the concave or sieve settings, the chopper settings, etc. Determining and displaying recommendations is indicated by block 282.

In yet another embodiment, expert control system 170 generates the control signals 172 in response to the action signal, and automatically provides the control signals 172 to the controlled systems to make automatic adjustments to the settings on machine 102. As one example, system 170 can provide a display indicating that the adjustments are about to be made. If desired, the operator can be provided with an option to override the automatic adjustments. For instance, if the field or crop conditions have changed, and system 170 is about to make adjustments, but the operator can visually perceive that the changes in conditions will last for only a very short time, then the operator can override the adjustments. Making the automatic adjustments, is indicated by block 284.

The engine control unit 169 can provide an action signal for other actions as well. This is indicated by block 286.

Engine control unit 169 then determines whether the actions were taken (either manually or automatically). This is indicated by block 288 in FIG. 4. If they were taken, then engine control unit 169 outputs a display element, for example vertical line 224 of FIG. 5, on the time continuous display to mark the time when the action was taken, and to identify the action. This is indicated by block 290 in FIG. 4.

At some point, either intermittently during operation, or after operation, or otherwise, engine control unit 169 can store the data that was used to generate the time continuous display, so that it can be replayed or otherwise analyzed. Storing the data is indicated by block 291 in FIG. 4.

In one embodiment, engine control unit 169 can also send the data to a remote location. This is indicated by block 292. For instance, the data can be sent, as it is generated, to a farm manager 294 who is monitoring the operator and machine 102. In another embodiment, information can be sent to a remote analysis system 296 where it is analyzed for ways to improve either the operator's training, or the performance of machine 102, or for other reasons. It can also be sent to an agronomist 298, to an equipment manufacturer 300, to various vendors 302, or to other remote locations 304.

As long as the operator continues to operate machine 102, control reverts back to block 206 in FIG. 4 where the time continuous display is generated based on the sensor signals. At some point, the operator will terminate operation of machine 102. This is indicated by block 306 in FIG. 4.

Figure 7:
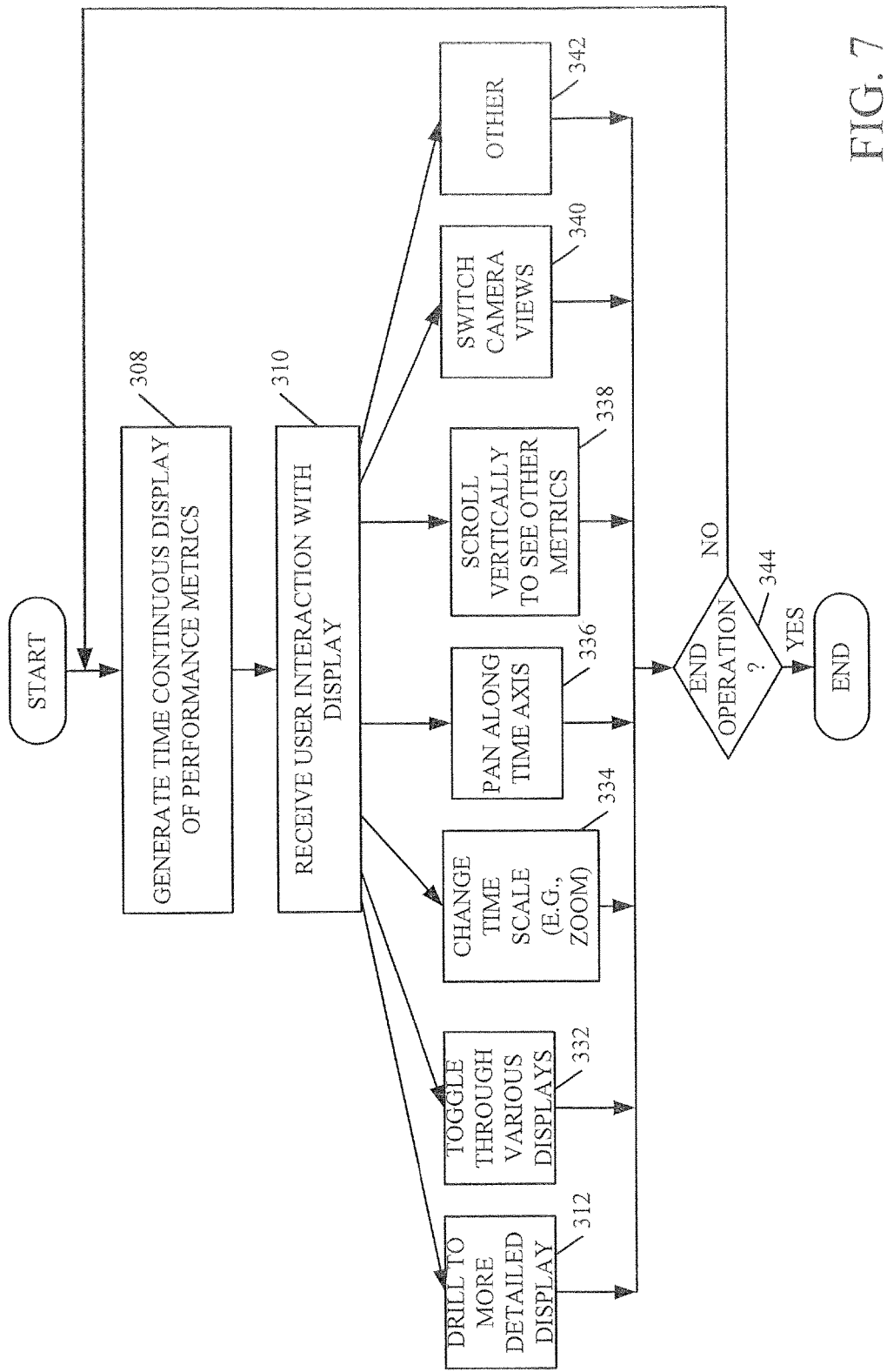
FIG. 7 is a flow diagram illustrating one embodiment of the operation of the control system shown in FIG. 3 in receiving user interactions with the time continuous user interface displays.
Figure 8:
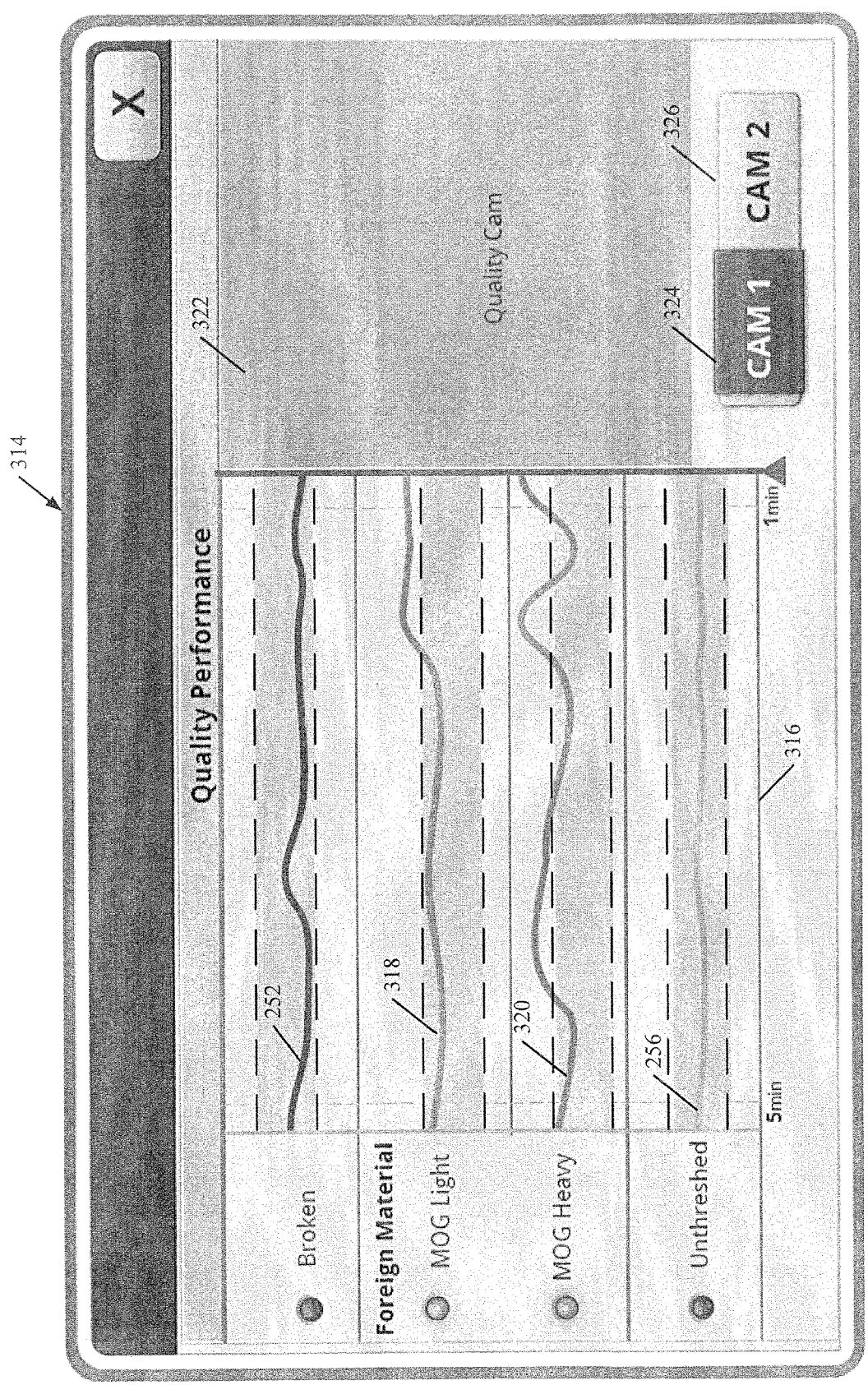
FIGS. 8-9 show exemplary user interface displays where a user drills into a display to view more details.
Figure 9:
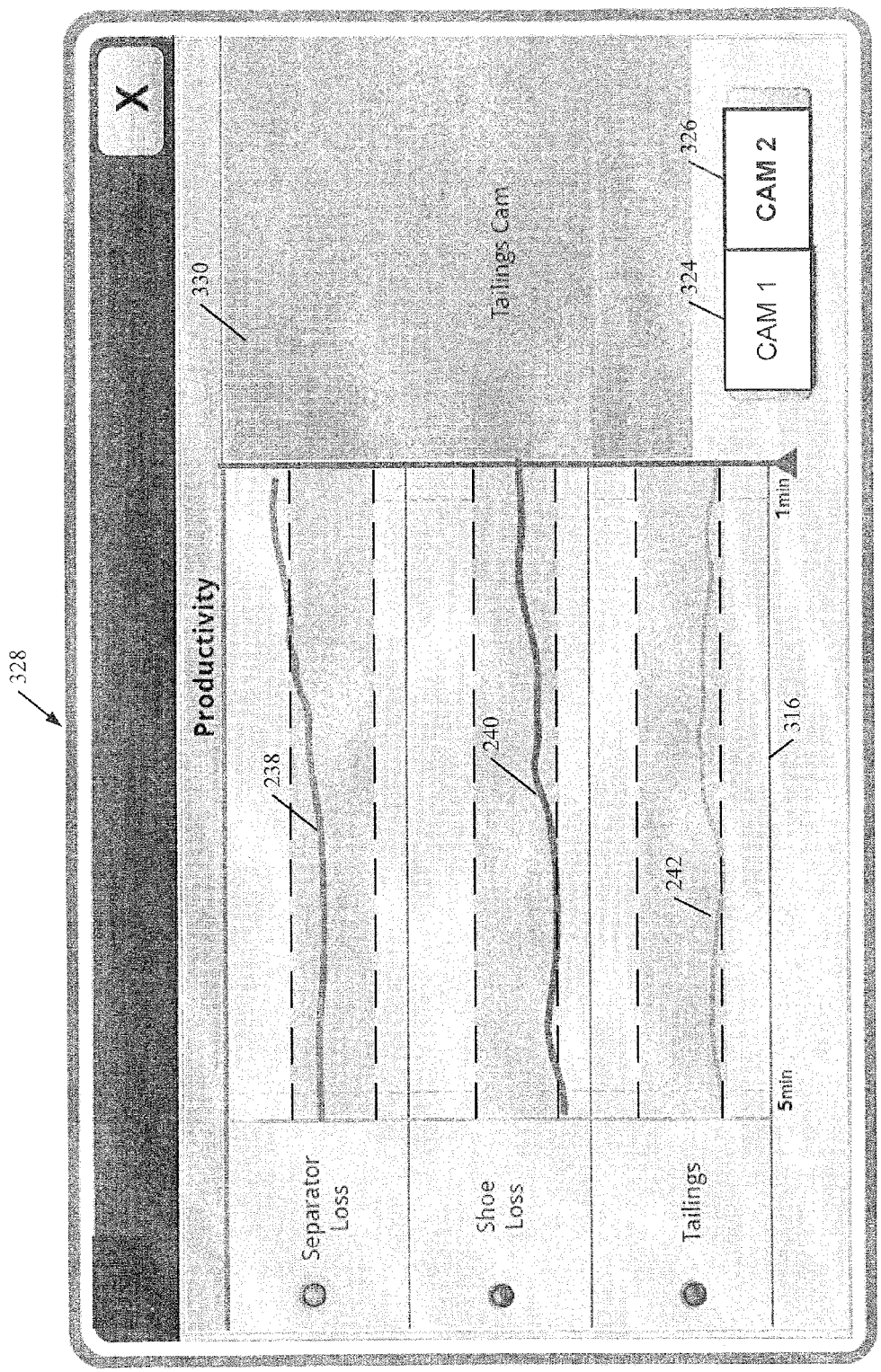

It will be appreciated that, in one embodiment, the operator can interact with the time continuous display in various ways. FIG. 7 is a flow diagram illustrating one embodiment of the operation of engine control unit 169, in greater detail, when the operator interacts with the time continuous display. FIGS. 8 and 9 are exemplary user interface displays. FIGS. 7-9 will now be described in conjunction with one another.

It is first assumed that engine control unit 169 is receiving the sensor signals and generating the time continuous display. This is indicated by block 308 in FIG. 7. Engine control unit 169 then receives a user interaction input interacting with one or more of the various user input mechanisms on the time continuous display. This is indicated by block 310.

The interactions can take a wide variety of different forms. For instance, the user may provide a drill-down input indicating that the user wishes engine control unit 169 to show a more detailed display of some portion of the time continuous display. This is indicated by block 312 in FIG. 7.

FIG. 8 shows one embodiment of a user interface display 314 that can be generated by engine control unit 169 when the user drills down into the quality display section 232 shown in FIG. 6. User interface display 314 shows that more detailed information is now displayed with respect to the quality performance metrics. For instance, the broken grain strip chart 252 and the un-threshed strip chart 256 are displayed in more detailed fashion so that the timeline 316 only stretches between a current value and five minutes in the past. In another embodiment, the user can touch a portion of the strip chart at a given spot and see any five minute period around that spot in greater detail. Thus, strip charts 252 and 256 show a more fine-grained variation of the corresponding performance metrics.

Display 314 also shows that the foreign material strip chart 254 has now been broken into two separate strip charts 318 and 320. Strip chart 318 is indicative of light material other than grain that is entering the clean grain tank 152. This may include such items such as chaff or other relatively light, non-grain materials. Strip chart 320 is indicative of material other than grain that is relatively heavy, such as corn cobs, stalks, etc. Thus, display 314 displays more detailed information corresponding to the quality performance metrics than display 228 shown in FIG. 6.

In addition, display 314 illustratively includes a visual image displayed in visual image display section 322. In the embodiment illustrated, section 322 shows an image generated by quality camera 166 (FIG. 3). The user can thus visually perceive the material entering the clean grain tank to determine whether the quality is acceptable.

In the embodiment shown in FIG. 8, display 314 also includes a pair of camera actuators 324 and 326. It can be seen that camera actuator 324 has been selected so that the live camera is camera 166. Thus the user is viewing the image generated by camera 166 in the clean grain tank 152. If the user actuates camera button 326, then the live camera switches so that the video display is from tailings camera 168.

FIG. 9 shows a user interface display 328 that displays more detailed information that can be generated when the user actuates the productivity display section 230 on user interface display 228 of FIG. 6. It can be seen in FIG. 9 that the strip charts 238, 240 and 242 are shown in greater detail (e.g., the timeline is zoomed in more) in FIG. 9 than they are in FIG. 6. Also, visual image display section 330 displays the video image generated by tailings camera 168.

In one embodiment, the user can continue to drill down for more detailed information by providing a drill down input on either of the displays shown in FIGS. 8 and 9. For example, if the user actuates the shoe loss strip chart 240 in FIG. 9, then engine control unit 169 generates a display that shows strip charts for both the left and right shoes, instead of the combined strip chart 240 that combines the performance metric for both shoes. Other drill down actuations can be performed to see other detailed information as well.

Referring again to the flow diagram of FIG. 7, in one embodiment, each of the various strip charts or display elements on the time continuous display can be displayed in various units. The user can illustratively actuate a user input mechanism to change the units of the displayed element. For instance, in the user interface display of FIG. 6, if the user actuates the productivity display 236, it toggles between displaying productivity in bushels per hour and bushels per acre or hectare. Toggling through various displays is indicated by block 332 in FIG. 7.

As discussed above, the user can also illustratively actuate user input mechanisms (such as "zoom in" and "zoom out" buttons 270 and 272 shown in FIG. 6) to change the time scale on the timeline. This is indicated by block 334.

As also mentioned above with respect to FIG. 6, the user can illustratively drag thumb 269 to pan horizontally along the timeline. This is indicated by block 336.

In yet another embodiment, the time continuous display displays only a subset of the performance metrics that are actually calculated. Therefore, in such an embodiment, the user can illustratively scroll the display vertically to see time continuous display elements corresponding to other performance metrics. By way of example, and referring again to the time continuous display 328 shown in FIG. 9, it may be that engine control unit 169 calculates additional performance metrics. By scrolling vertically, the user can see the display for those performance metrics as well. Scrolling vertically to see other performance metrics is indicated by block 338 in FIG. 7.

Also, as discussed above, the user can actuate the different camera buttons 324 and 326 to see the visual images generated by the corresponding cameras. This is indicated by block 340.

The user can also illustratively interact with the time continuous displays in other ways. This is indicated by block 342.

Again, at some point, the user will end the operation of machine 102. This is indicated by block 344.

It can thus be seen that the time continuous display displays performance metrics along a timeline, and it can also indicate when adjustments to the machine are recommended or made, or both. This allows the user to better understand how changes to the machine settings affect the performance of machine 102. The user can also interact with the display to perform various operations, and the data used to generate the display can be stored or sent to a remote site for later analysis or for other reasons.

It should also be noted that portions of the current description discuss the time continuous display being shown on machine 102. However, that need not be the case. Instead, the data used to generate the display can be sent to a remote site where the display is generated in quasi-real time, or in an asynchronous, time delayed manner. This can be done on any computing system. The displays can be stored and re-played at the remote site, when desired.

It will also be noted that while the time continuous display has been described with respect to an embodiment in which machine 102 is a combine, it can be used on a wide variety of other machines as well. For instance, mobile machine 102 can be a tractor, a cotton harvester, a sugarcane harvester, a seeder, or a variety of other agricultural, construction, turf or forestry machines.

As an example, where machine 102 is a planter (or seeder), the sensors 124 can sense the seed population (e.g., the number of seeds planted per linear measurement, per acre, etc.). The time continuous display illustratively provides a quasi-real time display indicating how the seed population varies over time. Adjustments to the machine settings that can be automatically made, or suggested, to modify the seed population (or the variations in seed population).

For instance, a fan in a planter creates a vacuum that pulls seeds through a tube to the ends of the planter. The hydraulic oil temperature in the planter can vary. When it fluctuates, then the fan speed that creates the vacuum that pulls the seeds out to the end of the planter can vary as well. This can affect the seed population. Thus, the time continuous display of seed population can indicate whether the planter is skipping areas or is planting seeds too close together, too far apart or whether the population is simply varying too much. The recommended actions or automatic adjustments can be those which would stabilize hydraulic oil temperature, and thus fan speed.

In another embodiment, if the machine 102 is a sprayer (of a liquid or granular material) the sensors 124 can sense the flow of the sprayed material to the spraying nozzles, and onto the field or plant. The time continuous display can thus identify whether the sprayed material is flowing at a consistent rate or whether it is varying.

In another embodiment, some relatively large sprayers can be 90-120 feet wide (or more). In some such sprayers, a controller controls mechanical actuators to manage the vertical position of the booms on the sprayer as well as the left-to-right tilt of those booms. In such an embodiment, sensors 124 can sense fluctuations in the mechanical actuators and this can be displayed on the time continuous display. If the time continuous display shows that the vertical position of the booms is varying relatively frequently, this may indicate that the controller is not maintaining the booms at a uniform height over the field. This can also indicate that the controller should be tuned by the operator. In one embodiment, a user input mechanism is provided so that the user can change the sensitivity of the controller so that the vertical boom position does not change so frequently. These are exemplary embodiments only. Others can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as handheld computers, cell phones, smart phones, multimedia players, personal digital assistants, etc.

Figure 10:
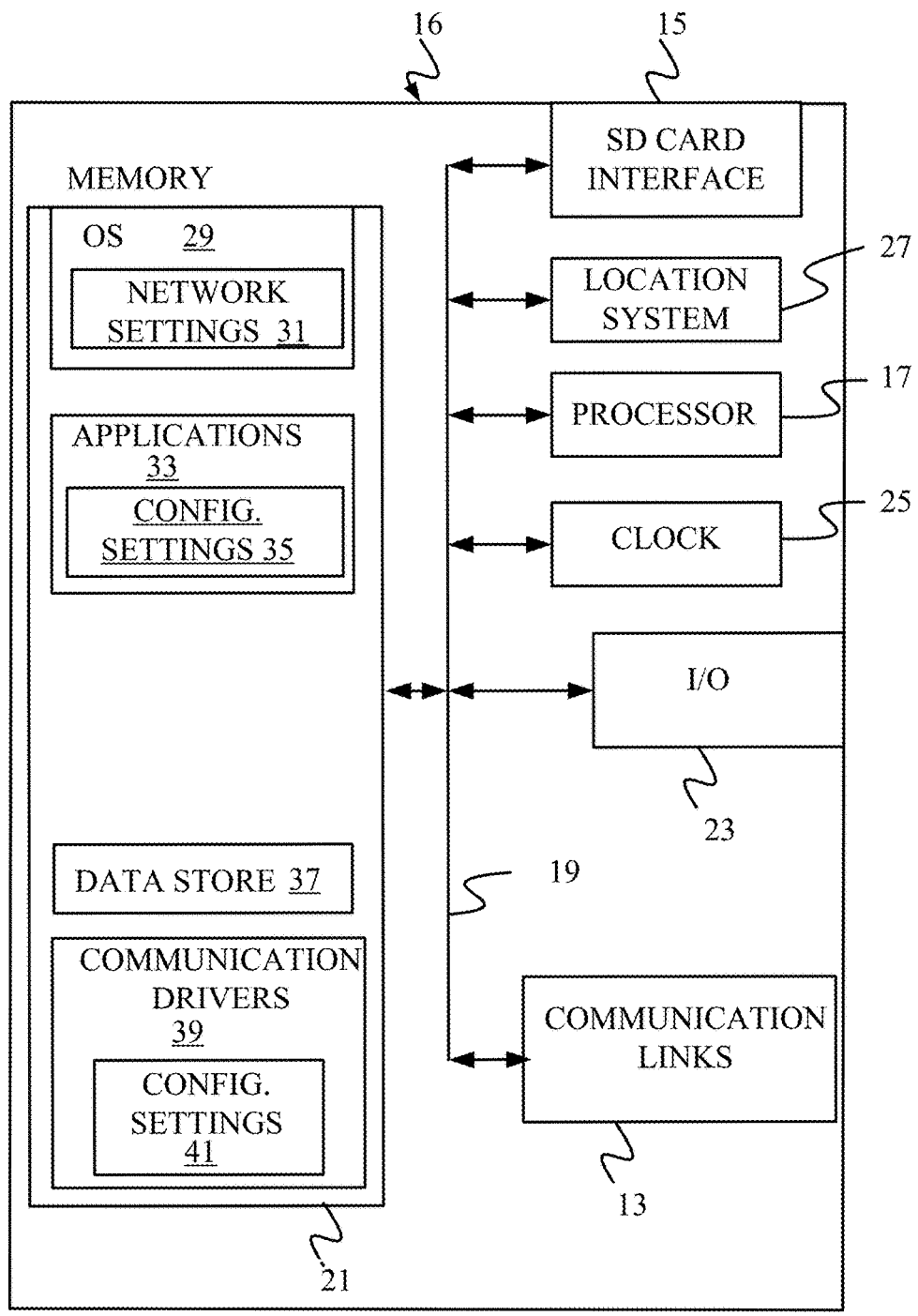
FIG. 10 is a block diagram of one embodiment of a mobile device that may reside in the operator compartment of a mobile machine.

FIG. 10 is a simplified block diagram of one illustrative embodiment of a handheld or mobile computing device that can be used as a user's or client's hand held device 16, in which the present system (or parts of it) can be deployed. For instance, device 16 can be a smart phone or tablet computer mounted within, or carried by the operator within, the operator's compartment of machine 102. It can be used to generate and display the time continuous display.

More specifically, FIG. 10 provides a general block diagram of the components of a client device 16 that can run some components of architecture 100 shown FIG. 1, that interacts with architecture 100, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor 114 from FIG. 1 or FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 11:
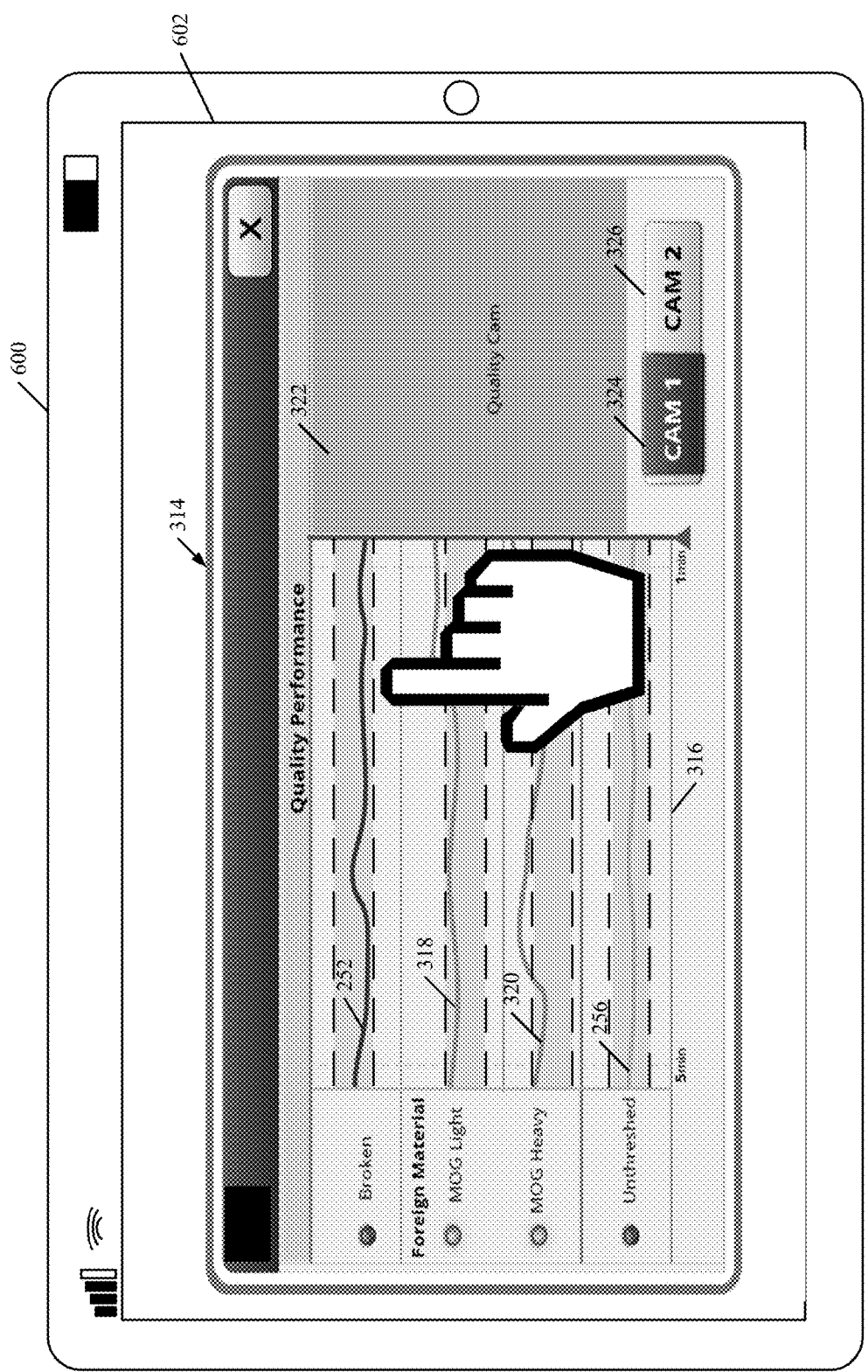
FIG. 11 shows an exemplary mobile device that may reside in the operator compartment of the mobile machine.

FIG. 11 shows one embodiment in which device 16 is a tablet computer 600. In FIG. 11, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Note that other forms of the devices 16 are possible.

Figure 12:
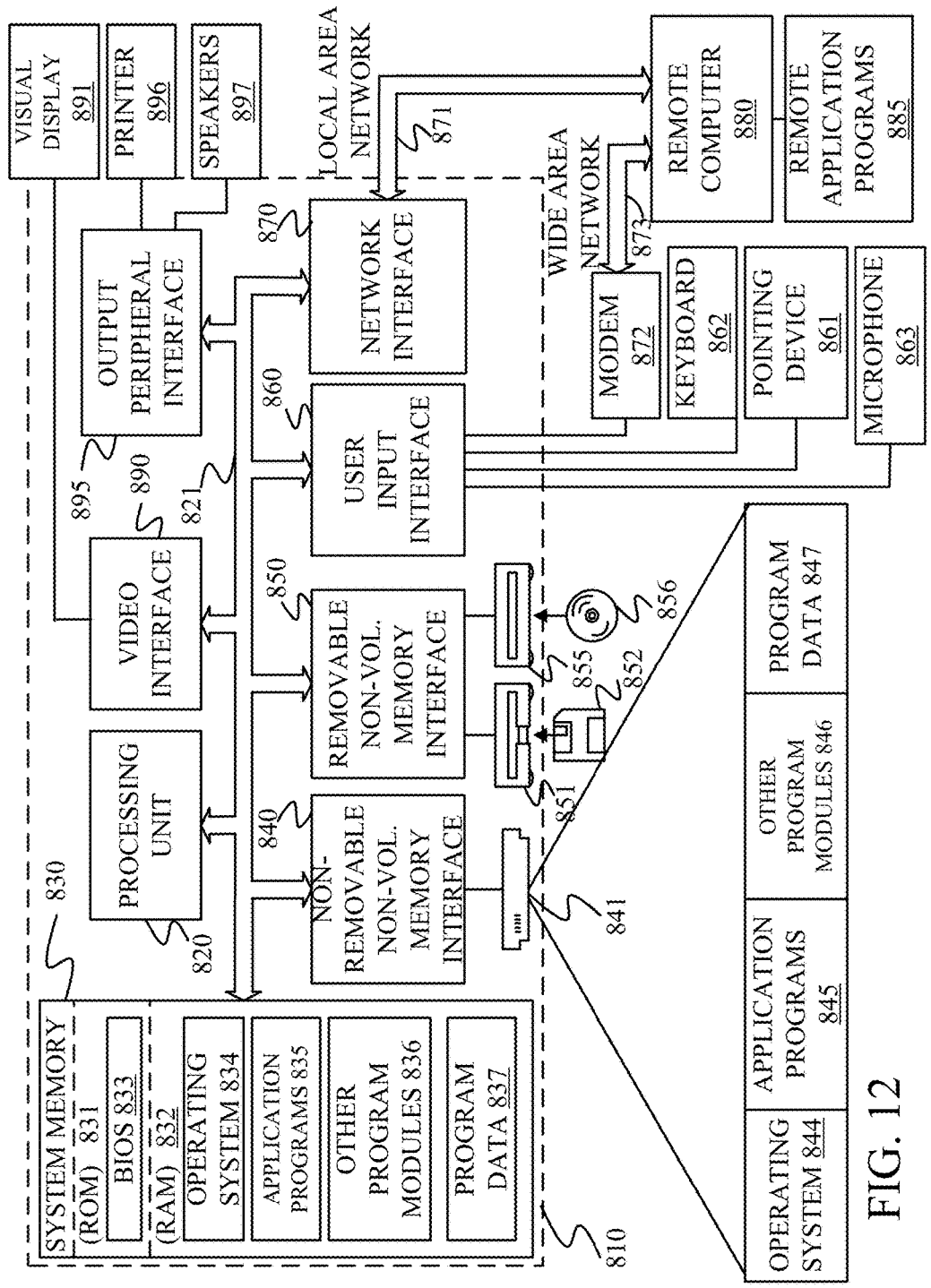
FIG. 12 is a block diagram of one illustrative computing environment which can embody the control systems shown in FIGS. 1 and 3.

FIG. 12 is one embodiment of a computing environment in which elements of FIG. 1, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 114), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed:
1. A computer-implemented method, comprising:
 detecting a first set of sensor signals output by at least one of a grain loss sensor and a yield sensor implemented with an agricultural machine;
 generating productivity performance metric values, based on the first set of sensor signals;
 detecting a second set of sensor signals output by an image processing system implemented with the agricultural machine;
 generating quality performance metric values, based on the second set of sensor signals;
 displaying, on a user interface display, a time continuous display including:

a productivity strip chart that visually identifies the productivity performance metric values along a timeline of operation of the agricultural machine, and a set of quality strip charts, each quality strip chart visually identifying one of the quality performance metric values along the timeline of operation;

defining a productivity performance window including a range of productivity threshold values, based on the productivity performance metric values;

defining a quality performance window including a range of quality threshold values, based on the quality performance metric values;

displaying, on the user interface display, the productivity performance window along the productivity strip chart and the quality performance window along the set of quality strip charts of the time continuous display;

automatically generating a control signal that controls operation of the agricultural machine, with a corresponding adjustment that is automatically applied to one or more settings of a controlled system to maintain a desired level of operating performance, based on a determination that at least one of the productivity performance metric values deviates outside of the range of productivity threshold values or a determination that at least one of the quality performance metric values deviates outside of the range of quality threshold values;

displaying, on the user interface display, an indication of where, along the time continuous display, the control signal is automatically generated along the timeline of operation of the agricultural machine;

based on receiving a drill input, selecting one of the quality performance metric values and displaying a more detailed display indicative of more detailed information corresponding to the selected quality performance metric value derived from the second set of sensor signals, and wherein displaying a more detailed display comprises:

displaying, along the timeline and with one or more of the quality strip charts, a time continuous display for each of a plurality of additional metric values derived from the second set of sensor signals and associated with the selected quality performance metric value.

2. The method of claim 1 wherein defining the productivity performance window and the quality performance window comprises:

receiving an indication of a user calibration input; and generating the range of productivity threshold values as a range around the productivity performance metric values when the user calibration input is received and generating the range of quality threshold values as a range around the quality performance metric values, when the user calibration input is received along the timeline of operation of the agricultural machine.

3. The method of claim 1 and further comprising:

displaying, on the user interface display, an action identifier identifying an action taken in response to the control signal, wherein the action identifier is indicative of a characteristic of the action taken and is indicative of a time, along the timeline, that the action was taken.

4. The method of claim 1 wherein automatically generating the control signal comprises:

generating an adjustment to a machine setting, based on a comparison of the productivity performance metric values to the range of productivity performance threshold values and a comparison of the quality performance metric values to the range of quality threshold values;

displaying an indication of the adjustment on the user interface display;

determining whether an operator override input is received; and if no operator override input is received, automatically generating the control signal to make the adjustment to the machine setting.

5. The method of claim 1 wherein displaying a more detailed display comprises:

displaying a video image corresponding to the second set of sensor signals sensed by the image processing system.

6. The method of claim 1 and further comprising at least one of:

panning the time continuous display horizontally along the timeline in response to the pan input; or scrolling the time continuous display vertically to show a third strip chart with the time continuous display, the third strip chart indicating additional metric values, in response to the scroll input.

7. The method of claim 1 and further comprising:

receiving a zoom input; and changing a time scale of the timeline, of operation of the agricultural machine, displayed in the time continuous display.

8. A computing system on an agricultural machine, comprising:

a sensor system comprising:

at least one of a loss sensor and a yield sensor that detects a first set of sensor signals based on sensed operation of the agricultural machine, and a quality sensor that detects a second set of sensor signals based on sensed operation of the agricultural machine;

a control system comprising a processor that generates productivity performance metric values, based on the first set of sensor signals, and generates quality performance metric values, based on the second set of sensor signals;

wherein the control system:

generates a time continuous display comprising:

a productivity strip chart that visually identifies the productivity performance metric values, as the first set of sensor signals are sensed, along a timeline of operation of the agricultural machine, and a set of quality strip charts, each quality strip chart visually identifying one of the quality performance metric values, as the second set of sensor signals are sensed, along the timeline of operation of the agricultural machine;

selects one of the quality performance metric values based on a detected drill user input, displays a more detailed display indicative of more detailed information corresponding to the selected quality performance metric value derived from the second set of sensor signals, the more detailed display displaying, along the timeline and with one or more of the quality strip charts, a time continuous display for each of the plurality of additional metric values derived from the second set of sensor signal values and associated with the selected quality performance metric value;

generates productivity threshold values and quality threshold values, detects deviation of at least one of:
the productivity performance metric values outside of the productivity threshold values, and
the quality performance metric values outside of the quality threshold values, and automatically generates a control signal that controls operation of the agricultural machine with a corresponding adjustment that is automatically applied to one or more settings of a controlled system to meet a particular level of operating performance of the agricultural machine; and displays an indication on the time continuous display, along the timeline of operation, that indicates:
when the control signal is automatically generated to control operation of the agricultural machine with a corresponding automatic adjustment that is applied to one or more settings of a controlled system of the agricultural machine, and
a type of the corresponding automatic adjustment.

9. The computing system of claim 8 wherein the control system receives a user interaction input indicative of a user interacting with the time continuous display and modifies the time continuous display based on the user interaction input.

10. The computing system of claim 9 wherein the control system modifies the time continuous display to show a more detailed display including detailed information corresponding to the time continuous display based on the user interaction input.

* * * * *